US010112179B2

(12) United States Patent
Steinfeld et al.

(10) Patent No.: US 10,112,179 B2
(45) Date of Patent: Oct. 30, 2018

(54) OPEN-CELL MATERIALS FOR USE IN THERMOCHEMICAL FUEL PRODUCTION PROCESSES

(71) Applicant: ETH Zurich, Zurich (CH)

(72) Inventors: Aldo Steinfeld, Brugg (CH); Jonathan Scheffe, Zurich (CH); Philipp Furler, Zurich (CH); Ulrich Vogt, Dubendorf (CH); Michal Gorbar, Dubendorf (CH)

(73) Assignee: ETH Zurich, Zurich (CH)

( * ) Notice: Subject to any disclaimer, the term of this patent is extended or adjusted under 35 U.S.C. 154(b) by 0 days.

(21) Appl. No.: 14/786,670

(22) PCT Filed: Apr. 23, 2014

(86) PCT No.: PCT/EP2014/001082
§ 371 (c)(1),
(2) Date: Oct. 23, 2015

(87) PCT Pub. No.: WO2014/173537
PCT Pub. Date: Oct. 30, 2014

(65) Prior Publication Data
US 2016/0114312 A1    Apr. 28, 2016

(30) Foreign Application Priority Data

Apr. 24, 2013   (EP) ..................... 13002155
May 6, 2013   (EP) ..................... 13075033

(51) Int. Cl.
*B01J 23/10*   (2006.01)
*C04B 35/26*   (2006.01)
(Continued)

(52) U.S. Cl.
CPC ............... *B01J 23/10* (2013.01); *B01J 35/04* (2013.01); *B01J 35/1076* (2013.01);
(Continued)

(58) Field of Classification Search
CPC .......... C01B 3/042; C01B 3/045; C01B 3/02; C04B 35/26; C04B 35/50; C04B 38/00;
(Continued)

(56) References Cited

U.S. PATENT DOCUMENTS 7,214,331 B2   5/2007   Jiang et al.
7,662,743 B2   2/2010   Satoh et al.
(Continued)

FOREIGN PATENT DOCUMENTS

EP   1570904 A1   9/2005
EP   1889651 A1   2/2008
EP   1903001 A2   3/2008

OTHER PUBLICATIONS

Twigg et. al., "Fundamental and Applications of Structured Ceramic Foam Catalysts", 2007, Ind. Eng. Chem. Res., 46, 4166-4177.*
(Continued)

*Primary Examiner* — James A Fiorito
(74) *Attorney, Agent, or Firm* — The Webb Law Firm

(57) ABSTRACT

The present invention provides for a structure for use in a thermo chemical fuel production process, said structure having a void phase and a solid phase, wherein the structure has an effective total optical thickness for solar radiation or effective total optical thickness for infrared radiation of from 0.1 to 10, wherein the solid phase has a geometrical specific surface area of more than $2*10^3$ $m^{-1}$ and wherein the solid phase comprises and preferably consists of a reactive material.

16 Claims, 2 Drawing Sheets

(51) Int. Cl.

| | |
|---|---|
| *C04B 35/50* | (2006.01) |
| *C04B 38/00* | (2006.01) |
| *C01B 3/02* | (2006.01) |
| *C01B 3/04* | (2006.01) |
| *C04B 41/45* | (2006.01) |
| *C04B 41/50* | (2006.01) |
| *C04B 41/52* | (2006.01) |
| *E04H 3/16* | (2006.01) |
| *B01J 35/04* | (2006.01) |
| *B01J 35/10* | (2006.01) |
| *B01J 37/02* | (2006.01) |
| *B01J 37/08* | (2006.01) |
| *C04B 111/00* | (2006.01) |
| *C04B 111/80* | (2006.01) |

(52) U.S. Cl.
CPC ............ *B01J 37/0215* (2013.01); *B01J 37/08* (2013.01); *C01B 3/02* (2013.01); *C01B 3/042* (2013.01); *C04B 35/26* (2013.01); *C04B 35/50* (2013.01); *C04B 38/00* (2013.01); *C04B 41/4539* (2013.01); *C04B 41/5027* (2013.01); *C04B 41/5045* (2013.01); *C04B 41/524* (2013.01); *E04H 3/16* (2013.01); *C04B 2111/00853* (2013.01); *C04B 2111/80* (2013.01); *C04B 2235/3229* (2013.01); *C04B 2235/3236* (2013.01); *C04B 2235/3258* (2013.01); *C04B 2235/3262* (2013.01); *C04B 2235/3263* (2013.01); *C04B 2235/3265* (2013.01); *C04B 2235/3267* (2013.01); *C04B 2235/3272* (2013.01); *C04B 2235/3274* (2013.01); *C04B 2235/9653* (2013.01); *Y02E 60/364* (2013.01)

(58) Field of Classification Search
CPC ............ C04B 41/4539; C04B 41/5027; C04B 41/5045; C04B 41/524; B01J 35/04; B01J 35/1076; B01J 37/0215; B01J 37/08; E04H 3/16
See application file for complete search history.

(56) References Cited

U.S. PATENT DOCUMENTS

| | | |
|---|---|---|
| 2008/0069765 A1 | 3/2008 | Jiang et al. |
| 2009/0166214 A1 | 7/2009 | Tao et al. |
| 2009/0208393 A1* | 8/2009 | Wenzel ................ F01N 3/0222 423/213.2 |
| 2010/0075839 A1* | 3/2010 | Tanada ................ B01D 53/945 502/304 |

OTHER PUBLICATIONS

Ferrizz et. al., "Monolithic Supports with Unique Geometries and Enhanced Mass Transfer", 2005, 44, 302-308.*

* cited by examiner

OPEN-CELL MATERIALS FOR USE IN THERMOCHEMICAL FUEL PRODUCTION PROCESSES

CROSS-REFERENCE TO RELATED APPLICATIONS

This application is the United States national phase of International Application No. PCT/EP2014/001082 filed Apr. 23, 2014, and claims priority to European Patent Application Nos. 13002155.3 and 13075033.4 filed Apr. 24, 2013 and May 6, 2013, respectively, the disclosures of which are hereby incorporated in their entirety by reference.

BACKGROUND OF THE INVENTION

Field of the Invention

The present invention relates to structures for use in a thermochemical fuel production process, to a method for manufacturing said structures, as well as to the use of such structures in a thermochemical fuel production process.

Description of Related Art

Solar-driven thermochemical cycles based on redox reactions of reactive metal oxides can split $H_2O$ and $CO_2$ to produce a mixture of $H_2$ and CO called "syngas", which is a precursor to the catalytic synthesis of conventional hydrocarbon liquid fuels, such as gasoline.

When solar-driven thermochemical cycles are coupled to the capture of $H_2O$ and $CO_2$ directly from atmospheric air, the obtained hydrocarbon fuels can be considered as being carbon neutral fuels, which is why there is considerable interest in developing efficient devices capable of thermochemical fuel production.

Among a variety of reactive metal oxides which exhibit a redox activity in a thermochemical process, ceria has emerged as an attractive redox active material because of its ability to rapidly conduct oxygen, thereby contributing to faster redox kinetics when compared to ferrite-based and other non-volatile metal oxides suitable for thermochemical cycling.

The two-step thermochemical $H_2O/CO_2$ splitting cycle based on ceria is represented by:

High-temperature reduction: $CeO_2 = CeO_{2-\delta} + \frac{1}{2}\delta O_2$     (1)

Low-temperature oxidation with $H_2O$: $CeO_{2-\delta} + \delta H_2O = CeO_2 + \delta H_2$     (2)

Low-temperature oxidation with $CO_2$: $CeO_{2-\delta} + \delta CO_2 = CeO_2 + \delta CO$     (3)

In the high-temperature reduction step, ceria is thermally reduced to a non-stoichiometric state.

At equilibrium, the oxygen deficiency ($\delta$) reaches 0.06 at approximately 1500° C. and $10^{-5}$ bar $O_2$ partial pressure.

In the subsequent low-temperature oxidation step, the reduced ceria is re-oxidized with $H_2O$ and/or $CO_2$ below approximately 1400° C. and $H_2$ and/or CO are formed.

Current apparatuses for use in a thermochemical fuel production process using fluid reactants rely on the exposure of the reactive metal oxide to concentrated solar radiation. In general, the solar radiation is concentrated either by single or multiple reflective surfaces or by focusing the solar radiation onto the reactive metal oxide through an array of optical lenses. The concentrated solar radiation heats the reactive metal oxide up the required temperature, driving the endothermic reduction of the metal oxide. Following this, the metal oxide is cooled, either by divergence of the concentrated solar radiation or by transport of the reduced metal oxide to a non-irradiated zone, and subjected to a flow of reactant gas, usually either $CO_2$, $H_2O$, or a mixture thereof.

The main parameters that influence the conversion efficiency of an apparatus useful for thermochemical fuel production processes are, on one hand the ability to effectively expose the surface of the reactive metal oxide to incident solar radiation, such that a maximum of the incident solar radiation's energy is transferred to the reactive metal oxide to be reduced, and on the other hand the ability to effectively expose the surface of the reactive metal oxide to the flow of fluid reactant, such that a maximum of fluid reactant is reduced into the desired fluid products by the oxygen-deficient reactive metal oxide.

In known devices suitable for thermochemical fuel production, the high-temperature reduction of the reactive metal oxide is achieved through the exposure to concentrated solar radiation. In order to increase the yield of syngas production during oxidation, the specific surface area of the reactive metal oxide is often maximized to the detriment of the ability of the device to efficiently absorb the incident solar radiation. Such structures can only absorb the incident solar radiation on their immediately exposed surface, the consequence being that the structure exhibits a steep temperature gradient across its thickness. Only the structure's surface exposed to incident solar radiation and the parts of the structure immediately underlying the surface will exhibit a temperature sufficiently high for thermochemical fuel production, whereas the more in-depth parts of the structure will be at a temperature below the threshold temperature for thermochemical fuel production.

For example, reactive metal oxide felts suffer from the problem that the radiant energy cannot penetrate into the bulk of the felt, because of its high optical thickness. This has the consequence that only the fibers on the outer surface are reduced to a point where they can react with the fluid reactant, thereby decreasing the yield of produced fuel. Alternatively, the optical thickness of a structure can be decreased through the use of so-called reticulated foam structures, or honeycomb structures which allow the concentrated solar radiation to be absorbed more efficiently, but the specific area of such structures is relatively low compared to optically thick structures such as the aforementioned felts, resulting in an unacceptably low syngas production rate.

It is therefore desirable to provide for a reactive metal oxide structure for use in a thermochemical fuel production process that would allow not only to increase the mass transfer rate between the fluid reactants and the reactive metal oxide, but which would also enable an increase in the amount of absorbed solar radiation.

SUMMARY OF THE INVENTION

The present invention provides for a structure for use in a thermochemical fuel production process, said structure having a void phase and a solid phase, wherein the structure has an effective total optical thickness for solar radiation or effective total optical thickness for infrared radiation of from 0.1 to 10, wherein the solid phase has a geometrical specific surface area of more than $2*10^3$ m$^{-1}$ and wherein the solid phase comprises and preferably consists of a reactive material.

The present invention further provides for a method for manufacturing said structure for use in a thermochemical fuel production process, the method comprising the steps of
a. depositing a layer of reactive material basecoat on a polymer structure, and optionally drying the layer of reactive material basecoat, such as to form a base-coated polymer structure, b. depositing a layer of reactive material topcoat on the base-coated polymer structure such as to form a precursor structure for use in a thermochemical fuel production process, c. firing said precursor structure at a temperature above 1000° C. such as to form the structure for use in a thermochemical fuel production process, wherein the reactive material basecoat comprises a particulate reactive material having a mean particle size of from 0.1 to 30 µm, a binder agent, a pore-forming agent and a dispersing agent and wherein the reactive material topcoat comprises a particulate reactive material having a mean particle size of from 0.1 to 30 µm, a pore-forming agent and a dispersing agent.

Further embodiments of the invention are laid down in the dependent claims

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
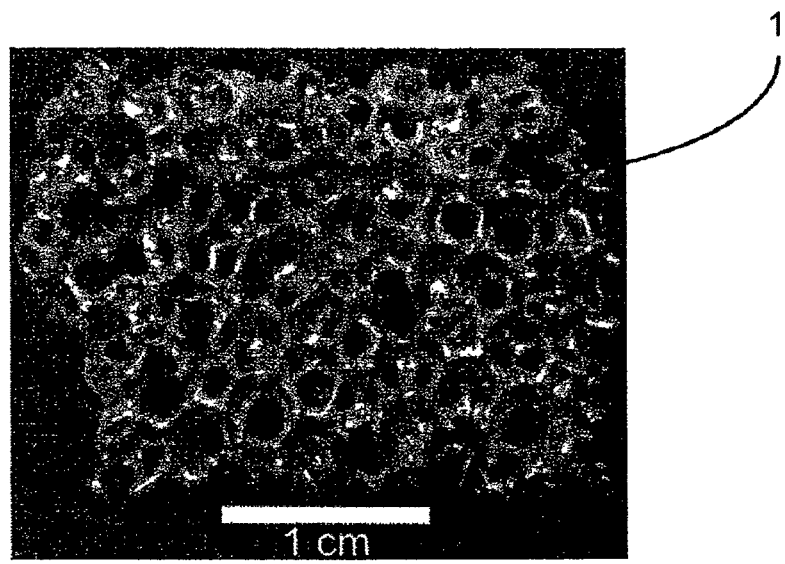
FIG. 1 shows a photograph of an ceria open-cell foam (1).
Figure 2:
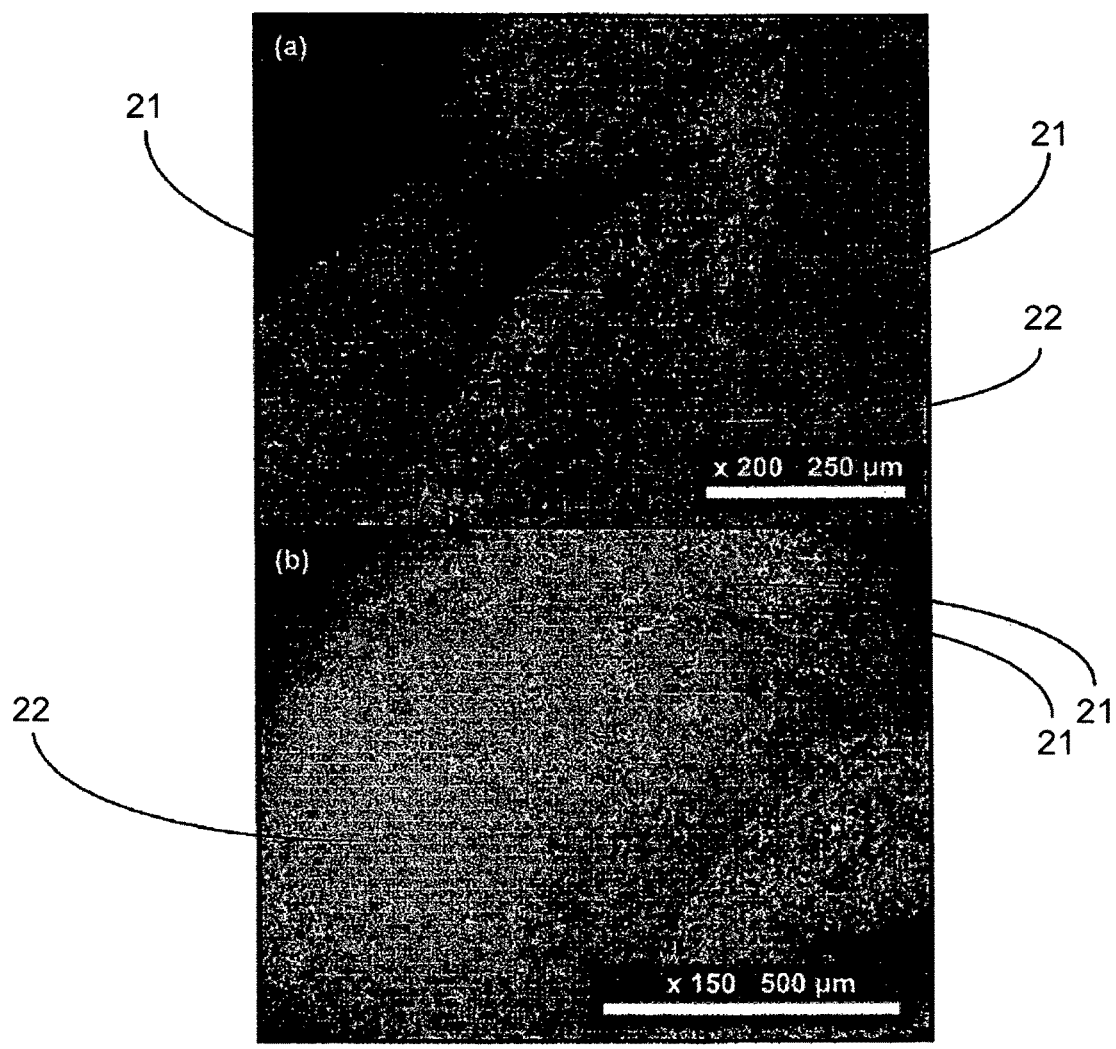
FIG. 2 shows SEM micrographs of a strut (22) break plane (a) and a strut (22) surface (b) of a ceria open-cell foam having pores (21), manufactured using a pore-forming agent loading of 50 volume percent.

In the context of the present invention, the terms "open-cell foam" or "reticulated foam" are used interchangeably.

In the context of the present invention, the terms "porosity" or "void fraction" are used interchangeably, and refer to the fraction of the volume of the void phase over the bulk volume of the open-cell foam structure.

In the context of the present invention, the term "volumetric penetration" refers to the penetration into the bulk volume of a structure, i.e. into the total volume of the structure. In the context of the present invention, the term "outer surface of the metal oxide open-cell foam" refers to the surface defined by the bulk of the metal oxide open-cell foam.

The term "geometrical specific surface area" refers to the surface area of the solid phase per unit volume of solid phase when measured by high-resolution computer tomography, and is expressed in $m^{-1}$.

The present invention solves the aforementioned problems of existing solutions in the field of thermochemical fuel production processes by providing a reactive material structure capable of more effectively exposing its bulk volume to incident solar radiation and capable of increasing the mass transfer rate between the fluid reactants and the reactive material of the structure by providing a structure having a specific effective total optical thickness and a geometrical specific surface area.

The present invention provides for a structure for use in a thermochemical fuel production process, said structure having a void phase and a solid phase, wherein the structure has an effective total optical thickness for solar radiation or effective total optical thickness for infrared radiation of from 0.1 to 10, wherein the solid phase has a geometrical specific surface area of more than $2*10^3$ $m^{-1}$ and wherein the solid phase comprises and preferably consists of a reactive material.

The structures of the present invention may be honeycomb or open-cell foam structures, which are suitable for the use in a thermochemical fuel production process.

The structures of the present invention may be used in a thermochemical fuel production process by heating the structures to a first temperature such that the reactive material comprised in the structure is reduced, and subsequently cooling the reduced reactive material to a second temperature and contacting a fluid reactant with the reduced reactive material at said second temperature, the second temperature being lower than the first temperature.

Fluid reactants include $CO_2$ or $H_2O$, as well as mixtures thereof.

A preferred source of radiant energy for bringing the structure of reactive material to a first temperature such that the metal oxide is reduced can be concentrated solar radiation. The solar radiation can be concentrated using either a single or array of mirrors that deflect the solar radiation towards the structure of reactive material, or by using a series of optical lenses that focus the solar radiation on the structure of reactive material. Alternatively, it is also possible to use a combination of these two techniques, or to store solar heat which can later be delivered to the reactive material structure through an infrared radiation source emitting infrared radiation.

While it is preferable that the structure of the present invention be manufactured directly to a desired shape, the structure of the present invention may also be post-processed, for example by cutting or machining, into any suitable shape such as for example spherical, tetrahedral, pyramidal, cubic, cuboid, conic, rod-shaped or more complex shapes. Such shapes may be either solid or partially hollowed out, like for example a tube.

In a preferred embodiment, the structure of the present invention comprises subunits that can be assembled and combined into a specific form. For example, one subunit in the shape of a circular plate and multiple subunits in the form of rings having preferably the same diameter as the circular plate can be stacked on top of the circular plate such as to form a tube with one dead end.

The structure for use in a thermochemical fuel production process according to the present invention has a void phase and a solid phase.

In the structure, the void phase corresponds to the void space in the structure, whereas the network of interconnected reactive material nodes corresponds to the solid phase.

The structure for use in a thermochemical fuel production process according to the present invention may have a void fraction of from 0.2 to 0.95, preferably of from 0.4 to 0.9, more preferably of from 0.6 to 0.8.

The structure for use in a thermochemical fuel production process according to the present invention has an effective total optical thickness for solar radiation or effective total optical thickness for infrared radiation of from 0.1 to 10.

The spectral optical thickness $\tau_\lambda$ is defined as the integral of the spectral extinction coefficient $K_\lambda$ along the radiative path S:

$$\tau_\lambda(S) = \int_0^S K_\lambda(S^*)dS^*$$

The effective total optical thickness $\tau$ is defined as the integral of the spectral optical thickness $\tau_\lambda$ over the all spectrum, weighted by the incident spectral incident irradiation $I_\lambda$:

$$\tau = \frac{\int_0^\infty \tau_\lambda I_\lambda d\lambda}{\int_0^\infty I_\lambda d\lambda}$$

The effective total optical thickness for incident solar radiation can be determined by:

$$\tau = \frac{\int_0^\infty \tau_\lambda I_\lambda d\lambda}{\int_0^\infty I_\lambda d\lambda} = \frac{\int_0^\infty \tau_\lambda e_{b\lambda} d\lambda}{\sigma T^4}$$

where T=5780 K
and $$e_{b\lambda}(\lambda, T) = \frac{2\pi C_1}{\lambda^5(e^{C_2/(\lambda T)} - 1)}$$

where:

$$\begin{cases} C_1 = 0.59552197 \cdot 10^8 \, W \cdot \mu m^4/m^2 \\ C_2 = 14{,}387.69 \, \mu m \cdot K \end{cases}$$

is the Planck's blackbody spectral hemispherical emissive power and $\sigma$ is the Stefan-Boltzmann constant.

The effective total optical thickness for incident infrared (IR) radiation can be determined by:

$$\tau = \frac{\int_0^\infty \tau_\lambda I_\lambda d\lambda}{\int_0^\infty I_\lambda d\lambda} = \frac{\int_0^\infty \tau_\lambda e_{b\lambda} d\lambda}{\sigma T^4}$$

where T is the temperature of the infrared (IR) radiation source.

The effective total optical thickness for solar radiation or effective total optical thickness for infrared radiation of from 0.1 to 10 of the structure according to the present invention allows for the volumetric penetration of the solar radiation into the bulk of the structure, which in turn allows a more delocalized heating of the reactive material comprised in the structure to a first temperature such that the reactive material is reduced. The immediate benefit is that more reactive material becomes reduced and that consequently more fuel can be produced per weight unit of reactive material, when compared to known forms of closed-cell foams or fibrous felts which exhibit an optically more dense structure, i.e. a less volumetrically penetrable morphology.

The reactive material comprised in the structure for use in a thermochemical fuel production process according to the present invention comprises, and preferably essentially consists of, a metal or a metal oxide, and most preferably comprises or essentially consist of a metal oxide.

Suitable metals may be chosen from nickel, iron, cobalt and preferably nickel. Suitable metal oxides may be chosen from iron oxide, iron oxide-based ferrites, ceria, doped ceria, manganese oxide, tungsten oxide, perovskites, preferably chosen from ceria or doped ceria. In the case where reactive material comprised in the structure for use in a thermochemical fuel production process according to the present invention comprises a metal oxide, the reactive material may be a mixture of metal oxide and an inert filler material also capable of withstanding the first temperature at which the reactive material is reduced. In another embodiment of the present invention, the reactive material comprised in the structure may be present in the form of one or more coating layers deposited on an inert filler scaffold structure.

Suitable inert filler material may be chosen from for example zirconia, alumina, alumina silicate, carbides like silicon carbide, graphite, and mixtures thereof.

In the preferred case where the structure according to the present invention essentially consists of a reactive material, the reactive material is preferably ceria or doped ceria.

Pure ceria is stable over the temperature ranges useful for thermochemical fuel production processes, provided that its fluorite-type crystal structure is maintained.

The solid phase of the structure for use in a thermochemical fuel production process according to the present invention may further comprise pores having a diameter from 0.5 to 500 $\mu m$, preferably of from 5 to 50 $\mu m$, more preferably of from 5 to 15 $\mu m$.

Because the solid phase of the structure for use in a thermochemical fuel production process according to the present invention comprises pores, the surface of the reactive material available for the thermochemical fuel production process can be further increased, resulting in an increase of the mass transfer rate between the fluid reactants and the reactive material of the structure The pores comprised in the solid phase may be essentially spherical, and can be formed for example by the addition of a carbon pore-forming agent in the method of manufacture for the structure of the present invention.

The solid phase of the structure for use in a thermochemical fuel production process according to the present invention has a geometrical specific surface area of more than $2*10^3$ $m^{-1}$, more preferably of from $5*10^4$ to $5*10^5$ $m^{-1}$ when measured by high-resolution computer tomography.

High-resolution computer tomography using a synchrotron light source (SLS) of 14 keV photon energy, 400 $\mu A$ beam current, 100 $\mu m$-thick aluminium filter, 20× geometrical magnification, 0.8 s exposure time, and 1501 projections was applied [1].

The two-point correlation function, $s_2(r)$, $$s_2(r) = \frac{\int_V \int_{4\pi} \psi(r)\psi(r+r\hat{s})d\Omega dV}{4\pi V} \quad (1)$$

with its properties $$s_2(0) = \varepsilon \quad [2]$$

and $$\left.\frac{ds}{dr}\right|_{r=0} = -\frac{A_0}{4}$$

is applied. $s_2(r)$ is computed by Monte Carlo. A random point is chosen within the fluid phase. A second random point is chosen at distance r. If the second point belongs to the fluid phase, the integrand in Eq. (1) is equal to 1. Otherwise, it is 0. The computation is performed for $10^8$ random points and for r varying between 0 and 1 cm.

An opening operation, consisting of erosion followed by dilation with structuring sphere of diameter d, is applied to compute the opening porosity $\varepsilon_{op}$ as a function of the diameter d. $\varepsilon_{op}$ is then used to determine the pore size distribution function $f$ [3], $$F(d) = \int_0^d f(d^*)dd^* = 1 - \frac{\varepsilon_{op}(d)}{\varepsilon_0} \quad (2)$$

where $\varepsilon_0 = s_2(0)$ . . . .
Nomenclature
A surface, $m^2$
$A_0$ geometrical specific surface, $m^{-1}$
d diameter, characteristic length scale, m
$f$ distribution function, $m^{-1}$
F probability distribution function
l length, m
r distance between two points in the sample, m
r position vector for spatial coordinates in the sample, m
s path length, m
$\hat{s}$ unit vector of path direction
$s_2$ two-point correlation function
S sample subvolume, $m^3$
V sample volume, $m^3$
Greek
ε porosity
ψ pore-scale indicator function (1=void phase; 0=solid phase)
Ω solid angle, sr As stated above, the geometrical specific surface area of more than $2*10^3$ $m^{-1}$ of the solid phase of the structure according to the present invention allows an enhanced mass transfer rate between the reduced reactive material and the fluid reactant, which is reflected in higher fuel production rates.

In the case where the structure for use in a thermochemical fuel production process according to the present invention is an open-cell foam structure, the open-cell foam structure may further be characterized by having at least 0.5 pores per inch, preferably of from 5 to 100 pores per inch, and more preferably of from 10 to 30 pores per inch.

In a preferred embodiment, the structure according to the present invention exhibits a gradient in effective total optical thickness for solar radiation or effective total optical thickness for infrared radiation, preferably along the direction of incident radiation.

Stated alternatively, the effective total optical thickness in one partial volume of the structure is different from the effective total optical thickness in another partial volume of the structure, with the proviso that the total optical thickness for solar or infrared radiation of each partial volume is of from 1 to 5.

A gradient in effective total optical thickness for solar radiation or effective total optical thickness for infrared radiation allows for an improved volumetric penetration of solar radiation into the bulk of the structure of the present invention, since the radiation will penetrate easily through the less dense partial volume before being more heavily absorbed in the denser partial volume. The effect is that the entire structure according to the present invention is more evenly heated by the incident radiation.

The present invention further provides for a method for manufacturing said structure for use in a thermochemical fuel production process, the method comprising the steps of: a. depositing a layer of reactive material basecoat on a polymer structure, and optionally drying the layer of reactive material basecoat, such as to form a base-coated polymer structure, b. depositing a layer of reactive material topcoat on the base-coated polymer structure such as to form a precursor structure for use in a thermochemical fuel production process, c. firing said precursor structure at a temperature above 1000° C., preferably a temperature of from 1200 to 2000° C. or 1400 to 1600° C., such as to form the structure for use in a thermochemical fuel production process, wherein the reactive material basecoat comprises a particulate reactive material having a mean particle size of from 1 to 30 μm, a dispersion medium, a binder agent, a pore-forming agent and a dispersing agent and wherein the reactive material topcoat comprises a particulate reactive material having a mean particle size of from 0.1 to 30 μm, a dispersion medium, a pore-forming agent and a dispersing agent.

In step a. of the method according to the present invention, depositing a layer of reactive material basecoat on a polymer structure such as to form a base-coated polymer structure can be done by for example dipping the polymer structure in the reactive material basecoat or by spraying the polymer structure with the reactive material basecoat.

Suitable polymer structure for the deposition of the reactive material basecoat are widely commercially available in various forms and may be from different polymer materials such as for example latex or polyurethane or polyester.

In a preferred embodiment, the polymer structure is an open-cell foam or honeycomb structure.

The polymer structure serves as a scaffold on which the reactive material basecoat is deposited.

The reactive material basecoat comprises a particulate reactive material that has been milled to mean particle size of from 0.1 to 30 μm, a dispersion medium, a binder agent, a pore-forming agent and a dispersing agent.

Suitable binder agents may be selected from known polymer binder agents and are preferably a polyvinyl alcohol-based binder agents.

In the reactive material basecoat, the binder agent is preferably comprised of from 1 to 5 weight percent, more preferably of from 2 to 3 weight percent, based on the total weight of the reactive material basecoat.

Optionally, the layer of reactive material basecoat can be dried before the base-coated polymer structure is further processed in step b.

Suitable dispersion mediums may be any known dispersion medium, and preferably a dispersion medium having an evaporation temperature below 100° C. at 1 bar, and most preferably is water or an alcohol such as ethanol, propanol, methanol.

In the reactive material basecoat, the pore-forming agent may be comprised of from 1 to 60 volume percent, more preferably of from 20 to 60 volume percent, based on the total volume of the reactive material and the pore-forming agent.

The dispersing agent may be any known dispersing agent, and is preferably present in amounts of from 0.1 to 1.5 weight parts per hundred weight parts of reactive material.

In step b. of the method according to the present invention, depositing a layer of reactive material topcoat on the base-coated polymer structure such as to form a top-coated polymer structure can be done by for example dipping the base-coated polymer structure in the reactive material topcoat or by spraying the base-coated polymer structure with the reactive material topcoat.

The reactive material topcoat essentially comprises the same ingredients, and in the same amounts, as the reactive material basecoat except that the binder agent is omitted. The reactive material topcoat thus comprises a particulate reactive material that has been milled to mean particle size of from 1 to 30 µm, a dispersion medium, a pore-forming agent and a dispersing agent.

The reactive material may be chosen from metal or metal oxides, and preferably is a metal oxide chosen from iron oxide, iron oxide-based ferrites, ceria, doped ceria, manganese oxide, tungsten oxide, perovskites, preferably chosen from ceria or doped ceria.

In step c. of the method according to the present invention, the obtained precursor structure is fired at a temperature above 1000° C., preferably at a temperature of from 1200 to 2000° C. or 1400 to 1600° C., such as to form the structure for use in a thermochemical fuel production.

During the firing, the polymer structure is burned away and only the structure comprising the reactive material, for use in a thermochemical fuel production process and having a void phase and a solid phase, remains. In step c., the pore-forming agent will be burned away upon firing the precursor structure and form the pores in the solid phase of the structure.

In the case where the polymer structure is an open-cell foam structure, the formed structure for use in a thermochemical fuel production process will be an open-cell foam structure.

In the case where the polymer structure is a honeycomb structure, the formed structure for use in a thermochemical fuel production process will be a honeycomb structure.

EXPERIMENTS

A first ceria slurry having a composition according to the ingredient list of Table 1 was prepared by mixing the ingredients except the binder agent together with 1000 g of zirconia balls having a diameter of between 5 and 10 mm in a ball mill for 24 hours. After this, the zirconia balls were removed from the slurry and the slurry was then transferred to a roll mill and the binder agent added.

The thus obtained mixture was then heated to 80° C. while continuously stirring to the dissolve the binder agent. After 1.5 hours, the heating plate was turned off and the defoaming agent was added under stirring.

Then 220 g (50 volume percent of a carbon pore-forming agent, based on the total volume of the ceria and the carbon pore-forming agent) were added to the first ceria slurry together with 220 g of water.

A polyurethane (PU) open-cell foam template having 10 pores per inch (ppi) foams (commercially obtainable from Fritz-Nauer AG) was cut to a size of 5×5×2 cm and completely immersed in the first ceria slurry and slightly squeezed, ensuring a complete coating. The coated PU foam was then removed from the ceria slurry and gently squeezed again to remove the excess ceria slurry. Additionally, excess ceria slurry was removed by blowing compressed air through the still wet foam structure to open eventually closed pores. The coated foam was then dried in air at room temperature for at least 24 hours.

TABLE 1

Ingredients for the ceria slurry.

| Ingredient | Amount | Function |
| --- | --- | --- |
| CeO$_2$ powder | 1000 g | reactive material |
| Distilled water | 200 g | dispersion medium |
| Dolapix CE 64 | 8.3 g | deflocculant agent |
| Optapix RA 4G (PVA)* | 20 g | binder agent |
| Contraspum KWE* | 40 drops | defoaming agent |

Ingredients labeled with a (*) are not added to slurries for second coatings.

The ceria powder was obtained from Sigma Aldrich (99.9% trace metal basis, particle size <5 µm).

A second ceria slurry having a composition according to the ingredient list of Table 1 but without the binding agent was prepared according to the procedure used for the preparation of the first ceria slurry.

The before-dried coated foam was then completely immersed, in the second ceria slurry, and excess ceria slurry was removed by blowing compressed air through the still wet coated foam to open eventually closed pores, and the coated foam was then dried in air at room temperature for at least 24 hours.

Figure 3:
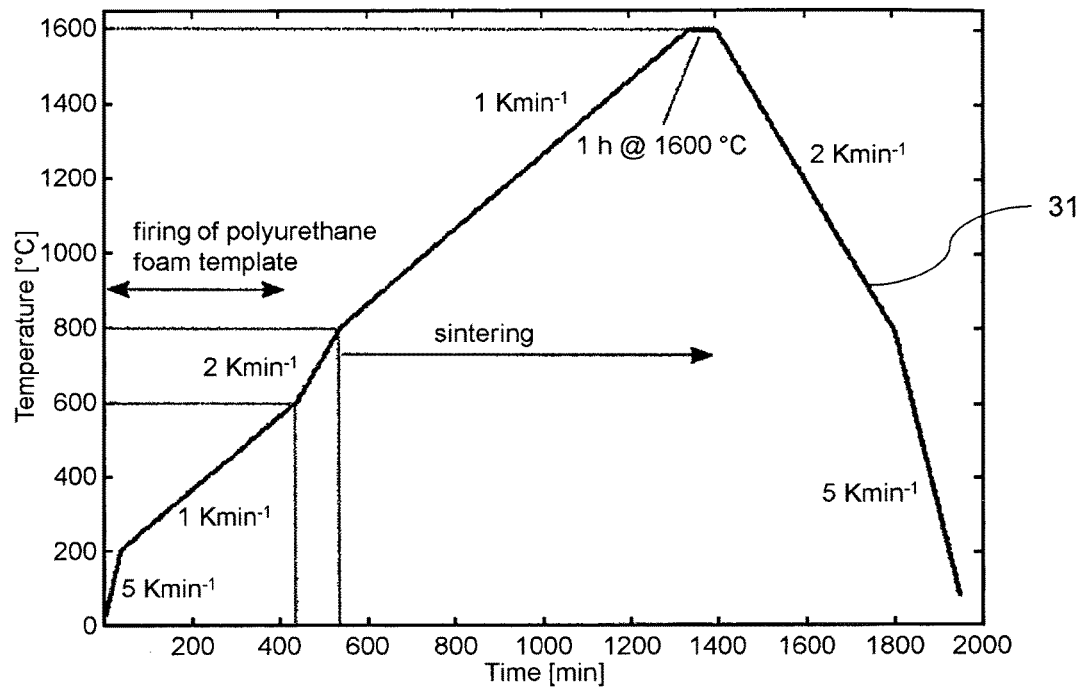
FIG. 3 shows an exemplary heating profile (31) for the manufacture of a ceria open-cell foam using a pore-forming agent loading of 50 volume percent.

The dried coated foam was first slowly heated up to 800° C. to burn away the PU foam and then fired and sintered in a high temperature furnace (Carbolite HTF 1700). The heating profile used is shown in FIG. 3

Figure 4:
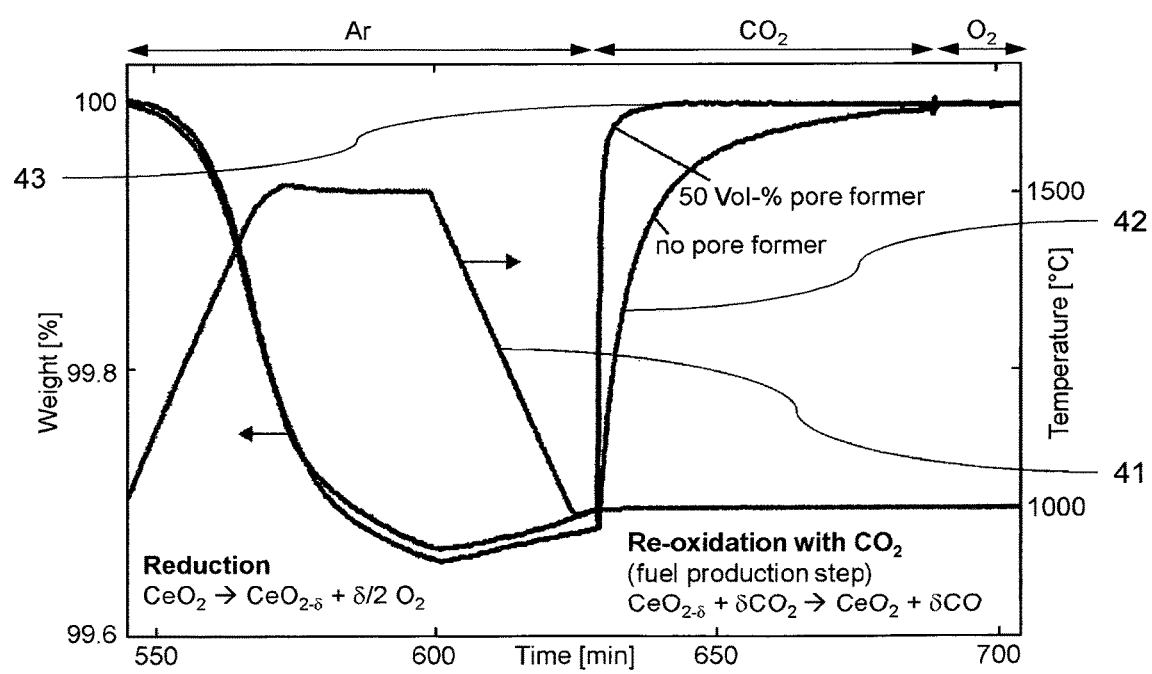
FIG. 4 shows a graph of thermogravimetric (TG) data for a ceria open-cell foam manufactured according to the present invention using a pore-forming agent loading of 50 volume percent (43) and for a comparative ceria open-cell foam (43) manufactured using no pore-forming agent, when going through the thermochemical fuel production process according to heating profile (41).

FIG. 4 shows TG-data for the thus manufactured ceria open-cell foam and a comparative ceria open-cell foam manufactured in the same way but where the ceria slurry lacked the pore-forming agent. The weight in percent versus time is plotted for the inventive ceria open-cell foam (43) and for the comparative (42) on the left y-axis and the furnace temperature is on the right y-axis and reflected in the heating profile (41).

In the first step, the samples were partially reduced at 1500° C. in an argon atmosphere having a low oxygen partial pressure of around $1.8*10^{-4}$ atm. The oxygen evolution kinetics are essentially the same for both samples, the reduction rate is essentially the same. After the reduction step, the sample was cooled to an oxidation temperature of 1000° C. After stabilizing at the oxidation temperature, CO-production was initiated by providing $CO_2$. Oxygen is re-incorporated to the ceria lattice, i.e. the ceria is re-oxidated, which causes the sample weight to increase back to its initial value. The slope in the weight versus time curve corresponds to the fuel production rate. The sample made with pore-forming agent-containing ceria slurry shows much steeper slope and hence fuel production rate. As a result, the re-oxidation of the ceria is completed much faster. The comparative sample was not fully re-oxidized after one hour of $CO_2$ injection whereas the re-oxidation of the inventive sample was finished after several minutes.

The invention claimed is:

1. A structure for use in a thermochemical fuel production process, said structure having a void phase and a solid phase,
    wherein the structure has an effective total optical thickness for solar radiation or effective total optical thickness for infrared radiation of from 0.1 to 10,
    wherein the solid phase has a geometrical specific surface area from $5*10^4$ to $5*10^5$ $m^{-1}$ when measured by high resolution computer tomography and
    wherein the solid phase consists of a reactive material, and wherein the reactive material is a metal oxide selected from the group consisting of iron oxide, iron oxide-based ferrites, ceria, doped ceria, manganese oxide, tungsten oxide, and perovskites.

2. The structure according to claim 1, wherein the structure is an open-cell foam structure.

3. The structure according to claim 1, wherein the structure is a honeycomb structure.

4. The structure according to claim 1, wherein it has an effective total optical thickness for solar radiation or effective total optical thickness for infrared radiation of from 1 to 5.

5. The structure according to claim 1, wherein it has a void fraction of from 0.2 to 0.95.

6. The structure according to claim 1, wherein the structure has from 0.5 to 100 pores per inch (ppi).

7. The structure according to claim 1, wherein the solid phase comprises pores having a diameter from 0.5 to 500 µm.

8. The structure according to claim 1, wherein it has a gradient in effective total optical thickness for solar radiation or effective total optical thickness for infrared radiation.

9. A method for manufacturing a structure for use in a thermochemical fuel production process according to claim 1, the method comprising the steps of:

a. depositing a layer of reactive material basecoat on a polymer structure, and drying the layer of reactive material basecoat, to form a base-coated polymer structure,
    b. depositing a layer of reactive material topcoat on the base-coated polymer structure to form a precursor structure,
    c. firing said precursor structure at a temperature above 1000° C., to form the structure for use in a thermochemical fuel production process,
    wherein the reactive material basecoat comprises a particulate reactive material having a mean particle size of from 0.1 to 30 µm, a dispersion medium, a binder agent, a pore-forming agent and a dispersing agent, and
    wherein the reactive material topcoat comprises said particulate reactive material having a mean particle size of from 0.1 to 30 µm, a dispersion medium, a pore-forming agent and a dispersing agent, and so as to form the structure according to claim 1.

10. The method for manufacturing a structure for use in a thermochemical fuel production process according to claim 9, wherein the polymer structure is an open-cell foam structure and the formed structure for use in a thermochemical fuel production process is an open-cell foam structure.

11. The method for manufacturing a structure for use in a thermochemical fuel production process according to claim 9, wherein the polymer structure is a honeycomb structure and the formed structure for use in a thermochemical fuel production process is a honeycomb structure.

12. The structure according to claim 1, comprising a void fraction of from 0.4 to 0.9.

13. The structure according to claim 1, comprising a void fraction of from 0.6 to 0.8.

14. The structure according to claim 1, wherein the solid phase comprises pores having a diameter of from 5 to 50 µm.

15. The structure according to claim 1, wherein the reactive material is a metal oxide selected from the group consisting of ceria and doped ceria.

16. The method for manufacturing a structure for use in a thermochemical fuel production process according to claim 9, wherein the reactive material is selected from the group consisting of ceria or doped ceria.

* * * * *